United States Patent
Chung et al.

(10) Patent No.: US 10,326,371 B2
(45) Date of Patent: Jun. 18, 2019

(54) PROVIDING ADAPTIVE OUTPUT POWER

(71) Applicant: SEMICONDUCTOR COMPONENTS INDUSTRIES, LLC, Phoenix, AZ (US)

(72) Inventors: BongGeun Chung, Siheung-si (KR); Taesung Kim, Yangcheon-gu (KR); Gwanbon Koo, Sunnyvale, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 15/683,939

(22) Filed: Aug. 23, 2017

(65) Prior Publication Data

US 2019/0068062 A1    Feb. 28, 2019

(51) Int. Cl.
| | |
|---|---|
| *H02M 3/335* | (2006.01) |
| *G05F 3/24* | (2006.01) |
| *H02H 7/122* | (2006.01) |
| *H02M 7/04* | (2006.01) |

(52) U.S. Cl.
CPC ........ *H02M 3/33507* (2013.01); *G05F 3/247* (2013.01); *H02H 7/122* (2013.01); *H02M 3/33523* (2013.01); *H02M 3/33561* (2013.01); *H02M 7/04* (2013.01)

(58) Field of Classification Search
CPC ......... H02M 3/33507; H02M 3/33523; H02M 3/33553; H02M 3/335; H02M 3/33538; H02M 3/33546
USPC ... 363/21.01, 21.06, 21.07, 21.14, 21.15, 97
See application file for complete search history.

(56) References Cited

U.S. PATENT DOCUMENTS

| | | |
|---|---|---|
| 5,034,871 A | 7/1991 | Okamoto et al. |
| 5,835,365 A | 11/1998 | Lee |
| 6,504,267 B1 | 1/2003 | Giannopoulos |
| 7,133,300 B1 | 11/2006 | Yang |
| 8,369,111 B2 | 2/2013 | Balakrishnan et al. |

(Continued)

OTHER PUBLICATIONS

Fairchild Semiconductor Corporation, "Design and Application of Primary-Side Regulation (PSR) PWM Controller," AN-6067 Application Note, Nov. 16, 2011, Rev. 1.0.2.

(Continued)

*Primary Examiner* — Alex Torres-Rivera
(74) *Attorney, Agent, or Firm* — Wash Park IP Ltd.; John T. Kennedy (57) ABSTRACT

Embodiments of devices, systems, and methods for controlling the output voltages and currents of a power converter as requested by an adaptive device are described. In one embodiment, a power converter includes a primary controller, a secondary controller, and an opto-coupler configured to communicate a communication request, including a load request, by a secondary controller to a primary controller in a feedback signal. A method may include the operations of: executing a request cycle, by extending an "ON" state for a secondary switch, detecting a slope change in a scaled primary voltage signal, entering a communication-ready mode, converting a load request into communication information communicated in a feedback signal using an opto-coupler, decoding the communication information, and adjusting at least one of a reference voltage for output current and a reference voltage.

20 Claims, 6 Drawing Sheets

(56) References Cited

U.S. PATENT DOCUMENTS

| | | | |
|---|---|---|---|
| 8,441,810 B2 | 5/2013 | Telefus et al. | |
| 8,804,380 B2 | 8/2014 | Gao et al. | |
| 8,897,038 B2 | 11/2014 | Li | |
| 9,024,613 B2 | 5/2015 | Murata | |
| 9,225,199 B2 | 12/2015 | Teggatz et al. | |
| 9,318,951 B2 | 4/2016 | Shirahata et al. | |
| 9,444,349 B2 | 9/2016 | Sato | |
| 9,893,638 B1* | 2/2018 | Strijker | H02M 3/33592 |
| 2001/0010638 A1 | 8/2001 | Kono | |
| 2002/0080625 A1* | 6/2002 | Goyhenetche | H02M 3/156 363/21.01 |
| 2007/0138971 A1 | 6/2007 | Chen | |
| 2008/0265849 A1 | 10/2008 | Lee | |
| 2010/0020216 A1 | 8/2010 | Sims et al. | |
| 2010/0195355 A1 | 8/2010 | Zheng | |
| 2011/0012554 A1 | 1/2011 | Lin et al. | |
| 2011/0103101 A1 | 5/2011 | Hiasa | |
| 2011/0103104 A1 | 5/2011 | Zhan et al. | |
| 2011/0291575 A1 | 12/2011 | Shiu et al. | |
| 2013/0083565 A1* | 4/2013 | Gaknoki | H02M 1/08 363/21.17 |
| 2014/0016359 A1 | 1/2014 | Telefus et al. | |
| 2014/0016362 A1 | 1/2014 | Adragna et al. | |
| 2014/0092647 A1 | 4/2014 | Ren et al. | |
| 2014/0146580 A1 | 5/2014 | Koo et al. | |
| 2014/0192565 A1* | 7/2014 | Wang | H02M 3/33592 363/21.14 |
| 2014/0192566 A1 | 7/2014 | Yang | |
| 2015/0180355 A1 | 6/2015 | Freeman et al. | |
| 2015/0280576 A1 | 10/2015 | Hinz et al. | |
| 2015/0303816 A1 | 10/2015 | Tumminaro et al. | |
| 2015/0349624 A1 | 12/2015 | Wang et al. | |
| 2016/0079874 A1 | 3/2016 | Lin et al. | |
| 2016/0149490 A1 | 5/2016 | Nakamura | |
| 2016/0294289 A1* | 10/2016 | Bui | G06F 1/266 |
| 2016/0329816 A1 | 11/2016 | Zhang et al. | |
| 2016/0344296 A1* | 11/2016 | Luo | H02M 3/33523 |
| 2016/0352237 A1 | 12/2016 | Quigley | |
| 2016/0359421 A1* | 12/2016 | Lin | H02M 3/33592 |
| 2017/0033698 A1* | 2/2017 | Vemuri | H02M 3/33592 |
| 2017/0047846 A1 | 2/2017 | Teo et al. | |
| 2017/0054376 A1 | 2/2017 | Quigley | |
| 2017/0063243 A1* | 3/2017 | Gong | H02M 3/33523 |
| 2017/0099047 A1 | 4/2017 | Hsiao et al. | |
| 2017/0250612 A1 | 8/2017 | Malinin et al. | |
| 2017/0317602 A1* | 11/2017 | Kleinpenning | H02M 1/08 |
| 2017/0338746 A1* | 11/2017 | Chen | H02M 1/08 |
| 2018/0019677 A1* | 1/2018 | Chung | H02M 3/155 |
| 2018/0138818 A1* | 5/2018 | Yang | H02M 3/33523 |

OTHER PUBLICATIONS

Fairchild Semiconductor Corporation, "Design Guideline for Primary Side Regulated (PSR) Flyback Converter Using FAN103 and FSEZ13X7," AN-8033 Application Note, Nov. 16, 2010, Rev. 1.0.1.
U.S. Appl. No. 15/705,389, filed Sep. 15, 2017.
U.S. Appl. No. 15/602,309, filed May 23, 2017.
U.S. Appl. No. 15/799,192, filed Oct. 31, 2017.
U.S. Appl. No. 15/705,389, Notice of Allowance, Examiner Interview Summary, and Lists of References, dated Dec. 21, 2018, 43 pages.
Chung et al., "Variable Blanking Frequency for Resonant Converters", U.S. Appl. No. 15/636,833, filed Jun. 29, 2017.

* cited by examiner

PROVIDING ADAPTIVE OUTPUT POWER

TECHNICAL FIELD

The technology described herein generally relates methods, systems, and apparatus for controlling currents and voltages produced by power converters. The technology described herein also relates to methods, systems, and apparatus for controlling currents and voltages produced by switch mode operated power converters. More specifically, the technology described herein relates to methods, systems, and apparatus for providing voltages and currents, using switch mode power converters, to adaptive devices. The technology may find use in conjunction with various electronic devices, such as power converters configured for use with personal communications devices, such as mobile phones and tablets, and with other devices which have varying load needs and whose needs for voltages and currents vary over time.

BACKGROUND

Today, power converters are commonly used in conjunction with various devices such as mobile phones, tablets, computers, and other adaptive and non-adaptive devices (hereafter, each an "adaptive device") to convert line voltages, such as the U.S. standard 120 volts AC, into various output voltages and currents (hereafter, each a "load request") then desired by an adaptive device. For example, load requests may include a request for a power converter to provide 5 volts at 1 Amp, while at a later time request 9 volts at 3 Amps, or other power levels, and vice versa. The reasons for such varying load requests are beyond the scope of the present disclosure, but, such requests may be presented to power converters at any time and commonly within wide variances of voltages and currents.

To address such varying load requests, three methods for controlling the operation and voltages and currents (collectively, the "output power") output by a power converter, such as a switch mode power converter, a buck converter, and other configurations (hereafter, each a "power converter"), to an adaptive device are commonly known. These methods include Primary Side Regulation ("PSR"), Secondary Side Regulation ("SSR"), and a combination of PSR and SSR ("combined regulation" or "CR"), where output voltages are often controlled using SSR and output currents are often controlled using PSR.

With SSR, the output power converter can be controlled with high sophistication such that, for example, variations in such output voltages and currents deviate from a desired level by less than ±5 percent and ±10 percent, respectively. This level of control, however, comes with certain known monetary costs, losses of power efficiency, heat concerns, and otherwise. For example, one commonly known SSR approach may include use of a sensing resistor, for sensing output current, and two or more opto-couplers for controlling both the output voltage and output current by controlling the primary side switching of a switch mode power converter. The sensing resistor consumes power, and the opto-couplers add costs and complexity.

For PSR, similar concerns arise. While PSR eliminates the need for a sensing resistor, it does so at the cost of providing less certainty in output voltage and current control. It is commonly appreciated that PSR is typically unable, at reasonable costs, to provide the "highly sophisticated" control achievable with SSR. Further, when PSR is used without opto-couplers, output voltages and currents are controlled based on estimates—such estimates commonly being determined based on the voltages and currents generated by tertiary windings on transformers used in power converters or using other known techniques. Such estimates typically induce an error between the actual voltages and currents output by a power converter versus the requested output voltages and currents.

For combined regulation, CR, similar concerns arise. While a sensing resistor is not required to control output current, added complexity and costs are commonly incurred by using an additional opto-coupler to communicate output current load requests to components used on the primary side of the power converter. Thus, improvements on how to communicate load requests in power converters are needed that eliminate costs, reduce energy consumption, and address the above and other known concerns.

The various embodiments of the present disclosure address the above and other concerns by providing highly sophisticated control of output voltages and currents by power converters to adaptive devices based on then existing load requests by using a single opto-coupler and supporting circuitry and components configured to communicate communication signals provided by an adaptive device, such signals indicating a then desired output current and voltage desired by the adaptive device, to the primary side of a power converter. The primary side of the power converter being adapted to control the output current of the power converter, while the second side controls the output voltage. Accordingly, as discussed below, the various embodiments described avoid costs, inefficiencies and complexities arising from the use of sensing resistors and multiple opto-couplers of prior art approaches.

SUMMARY

In accordance with at least one embodiment of the present disclosure an apparatus, system, or method for controlling the output currents and voltages provided by a power converter to an adaptive device based on a then arising load request is provided.

For at least one embodiment, a power converter includes a transformer having a first coil located on a primary side of the transformer, a second coil located on a secondary side of the transformer. The first coil is electrically coupled to a power source. The second coil is electrically coupled to and configured to provide an output current and an output voltage to an adaptive device. The primary side is electrically isolated from the secondary side. The power converter includes a primary controller that is electrically coupled to the first coil and is configured to control the operating status of the first coil. The power converter also includes a secondary controller that is electrically coupled to the second coil. The power converter also includes an opto-coupler having a send side electrically coupled to the secondary controller and a receive side electrically coupled to the primary controller. The opto-coupler is configured to communicate a communication request in a feedback signal generated by the secondary controller, wherein the communication request represents a load request received from an adaptive device.

In at least one of the embodiments, the opto-coupler is electrically coupled to the second coil and the feedback signal represents the output current and the output voltage provided to an adaptive device during a first steady-state cycle. The feedback signal includes the communication request during a second request cycle.

In at least one of the embodiments, the load request is received from the adaptive device by the second controller and the second controller includes logical and discrete elements configured to convert the load request into the communication request and communicate the communication request, in the feedback signal, to the primary controller by controlling an operating state of the opto-coupler.

In at least one of the embodiments, the communication request is a pulse coded representation of the load request, and the second controller encodes the pulse coded representation into the feedback signal by controlling the operating state of the opto-coupler.

In at least a second embodiment, a power converter includes a transformer having a first coil located on a primary side of the transformer, a second coil located on a secondary side of the transformer. The first coil is electrically coupled to a power source. The second coil is electrically coupled to and configured to provide an output current and an output voltage to an adaptive device. The primary side is electrically isolated from the secondary side. The power converter includes a primary controller that is electrically coupled to the first coil and is configured to control the operating status of the first coil. The power converter also includes a secondary controller that is electrically coupled to the second coil. The power converter also includes an opto-coupler having a send side electrically coupled to the secondary controller and a receive side electrically coupled to the primary controller. The opto-coupler is configured to communicate a communication request in a feedback signal generated by the secondary controller, wherein the communication request represents a load request received from an adaptive device. The power converter also includes a first switch, coupled to the first coil and the first controller and a second switch, coupled to the second coil and the second controller. The second controller is configured to control the operating state of the second coil by controlling the operating state of the second switch, such that upon receiving the load request, the second controller extends the turn-on time of the second switch until the polarity of the second switch reverses and during a third steady-state cycle arising after the completion of the request cycle, controls the operation the second switch such that the second coil provides at least one of the output current and output voltage requested in the immediately previously received load request.

In at least one of the second embodiments, the secondary controller is also configured to adjust the output voltage of the power converter, in response to a load request, by adjusting a reference voltage utilized by the secondary controller.

In at least one of the embodiments, a primary controller, for use in controlling the operation of a power converter is described. The power converter comprises a transformer having a first coil on a primary side and a second coil on a secondary side. The primary side is electrically isolated form the secondary side and is connected to a power source. The secondary side is connected to an adaptive device. The primary controller includes at least one logical and discrete element configured to control the operating status of the first coil and adjust the output current of the power converter based upon a communication request received in a feedback signal communicated by a secondary controller to the primary controller via an opto-coupler. The secondary controller is located on a secondary side of the power converter. The secondary controller is electrically connected to the second coil and the adaptive device, and includes one or more logical and discrete elements configured to control the operating status of the second coil.

In at least one of the embodiments, the primary controller includes a first comparator, configured to compare a reference voltage signal to a sensed voltage signal. The primary controller also includes a second comparator, configured to compare a reference voltage for an output current signal to a sensed voltage signal, wherein the sensed voltage signal is generated by the power converter during each switching cycle. The primary controller also includes a pulse controller, electrically connected to the first comparator and the second comparator, and configured to generate duty-cycle signals for each switching cycle. The primary controller also includes a switch driver, electrically connected to the pulse controller and a first switch. The first switch is electrically connected to and controls the operating status of the first coil. The switch driver controls the operating status of the first switch and the first coil for each switching cycle based on duty-cycle signals received from the pulse controller.

In at least one of the embodiments, the primary controller includes a detector circuit, electrically connected to the third coil and comprising logical and discrete elements configured to: output a time duration signal which provides a representation of the second switch conduction time; detect a change in a slope arising in a resonant portion of the drain voltages of the first switch during a first steady-state switching cycle; and upon detecting a change in the slope, output a variation signal, wherein the variation signal initiates a request switching cycle for the power converter.

In at least one of the embodiments, the primary controller includes an output current estimator circuit electrically connected to the second comparator, the first switch, and the detector circuit. The output current estimator circuit includes logical and discrete elements configured to: receive the sensed voltage signal; receive the time duration signal; receive a feedback current signal; and generate and output the reference voltage for output current signal. During a request cycle, the output current estimator circuit adjusts the reference voltage for output current signal based upon a load request received from the adaptive device by the secondary controller.

In at least one of the embodiments, the primary controller includes a feedback circuit, electrically connected to the detector circuit, the output current estimator, the first comparator, a variable resistor, and an opto-coupler. The feedback circuit includes logical and discrete elements configured to: output the reference voltage signal to the first comparator; output an impedance change signal which adjusts the impedance of the variable resistor; decode, from a communication request provided in a feedback signal sent by the secondary controller to the primary controller during a request cycle, a requested output current received from the adaptive device; and output to the current estimator circuit a feedback current signal representative of the requested output current.

In at least one of the embodiments, the feedback circuit, upon receiving the variation signal, reduces the impedance of the variable resistor to a null value and until the communication request is received and decoded.

In at least one of the embodiments, the feedback circuit is configured to: sample and hold a reference voltage signal communicated in the feedback signal for a first steady-state switching cycle; upon receipt of the variation signal, continue to output the held reference voltage signal to the first comparator while the communication request is decoded; upon decoding the communication request, adjust the impedance of the variable resistor; and output a second reference voltage signal to the first comparator, wherein the second reference voltage signal reflects a requested output voltage received from the adaptive device.

In at least one embodiment, a method is provided for controlling the output voltages and currents of a power converter as requested by an adaptive device, wherein the power converter comprises a transformer having a first coil, a second coil and a third coil. The first coil is located on a primary side of the transformer and is electrically connected to a power source. The second coil is located on a secondary side of the transformer and is connected and provide the output voltages and currents to an adaptive device. The third coil is a tertiary winding on the primary side of the transformer. The primary controller controls the operating state of a primary switch connected to the first coil and is electrically connected to both the first coil and the third coil. A secondary controller is electrically isolated from the primary controller and controls the operating state of a secondary switch connected to the second coil. The method includes the operation of, during a first steady-state cycle, receiving, by a secondary controller, a load request in a device signal sent by the adaptive device. The method may also include the operation of executing a request cycle. For at least one embodiment, the operation of executing a request cycle may include extending, by the secondary controller, an "ON" state for the secondary switch. These operations may also include detecting, by a primary controller, a change of slope in a scaled primary voltage signal generated by the third coil. These operations may also include entering, by the primary controller, a communication-ready mode. These operations may also include converting, by the secondary controller, the load request into communication information and communicating, by the secondary controller, the communication information in a feedback signal using an opto-coupler communicatively connecting the secondary controller with the primary controller. These operations may also include decoding, by the primary controller, the communication information. These operations may also include adjusting, by the primary controller, at least one of a reference voltage for output current and a reference voltage and resuming steady-state switching with at least one third, steady-state cycle.

In at least one of the embodiments, a method for controlling the output voltages and currents of a power converter as requested by an adaptive device may include encoding the communication information into the feedback signal sent by the opto-coupler. For at least one embodiment, the secondary controller may control such encoding by controlling the operating state of the opto-coupler.

In at least one of the embodiments, a method for controlling the output voltages and currents of a power converter as requested by an adaptive device may include, when the load request includes an output voltage change request to change the output voltage, and during the request cycle, adjusting, by the secondary controller, a first reference value of a variable capacitor to respond to the output voltage change request; comparing the first reference value to a reference voltage signal; and based on the comparison, adjusting the feedback signal.

In at least one of the embodiments, a method for controlling the output voltages and currents of a power converter as requested by an adaptive device, when a load request requests a change in the output current and the output voltage, may be implemented in a power converter wherein the output current is controlled by a primary controller and the output voltage is controlled by a secondary controller.

In at least one of the embodiments, a method for controlling the output voltages and currents of a power converter as requested by an adaptive device, when a load request requests a change in the output current and the output voltage, may be implemented in a power converter wherein the output current is controlled by the secondary controller and the output voltage is controlled by the primary controller.

In at least one of the embodiments, a method for controlling the output voltages and currents of a power converter as requested by an adaptive device, may include the operation of entering a communication-ready mode by adjusting a reference voltage signal utilized by the primary controller to control an operating state of the primary switch, wherein the adjustment to the reference voltage signal results in the primary switch remaining in an "OFF" state.

In at least one of the embodiments, a method for controlling the output voltages and currents of a power converter as requested by an adaptive device may include, during a first steady-state cycle, sampling and holding an output voltage signal communicated in the feedback signal by the secondary controller to the primary controller using the opto-coupler. The method may also include the operations of, during a request cycle and while continuing to decode the communication information received from the secondary controller, resuming steady-state operation of the primary switch by adjusting the reference voltage signal back to a previously sampled and held output voltage signal. The method may also include the operations of, after decoding the communication information, adjusting the reference voltage signal to reflect the output voltage requested by the adaptive device in the load request.

BRIEF DESCRIPTION OF THE DRAWINGS

The features, aspects, advantages, functions, modules and components of the apparatus, systems, and methods provided by the various embodiments of the present disclosure are further disclosed herein regarding at least one of the following descriptions and accompanying drawing figures.

DETAILED DESCRIPTION

The various embodiments described herein are directed to apparatus, systems, and methods for controlling currents and voltages produced by power converters. More specifically, the embodiments described herein are directed to methods, systems, and apparatus for controlling currents and voltages produced by switch mode operated power converters. More specifically, the embodiments described herein are directed to methods, systems, and apparatus for providing voltages and currents, using switch mode power converters, to adaptive devices. The embodiments described herein may find use in electronic devices, such as power converters configured for use with personal communications devices, such as mobile phones and tablets, and with other devices which have varying load needs and whose requests for voltages and currents provided by a power converter vary over time. While the various embodiments set forth herein, and as shown in the attached drawing figures, provide sufficient information for a person of ordinary skill in the art to practice one or more of the inventions, as claimed herein or as later claimed in any application claiming priority to this disclosure, it is to be appreciated that one or more embodiments may be practiced without one or more of the details provided herein. As such, the various embodiments described herein are provided by way of example and are not intended and should not be used to limit the scope of any invention claimed to embodiment.

Figure 1:
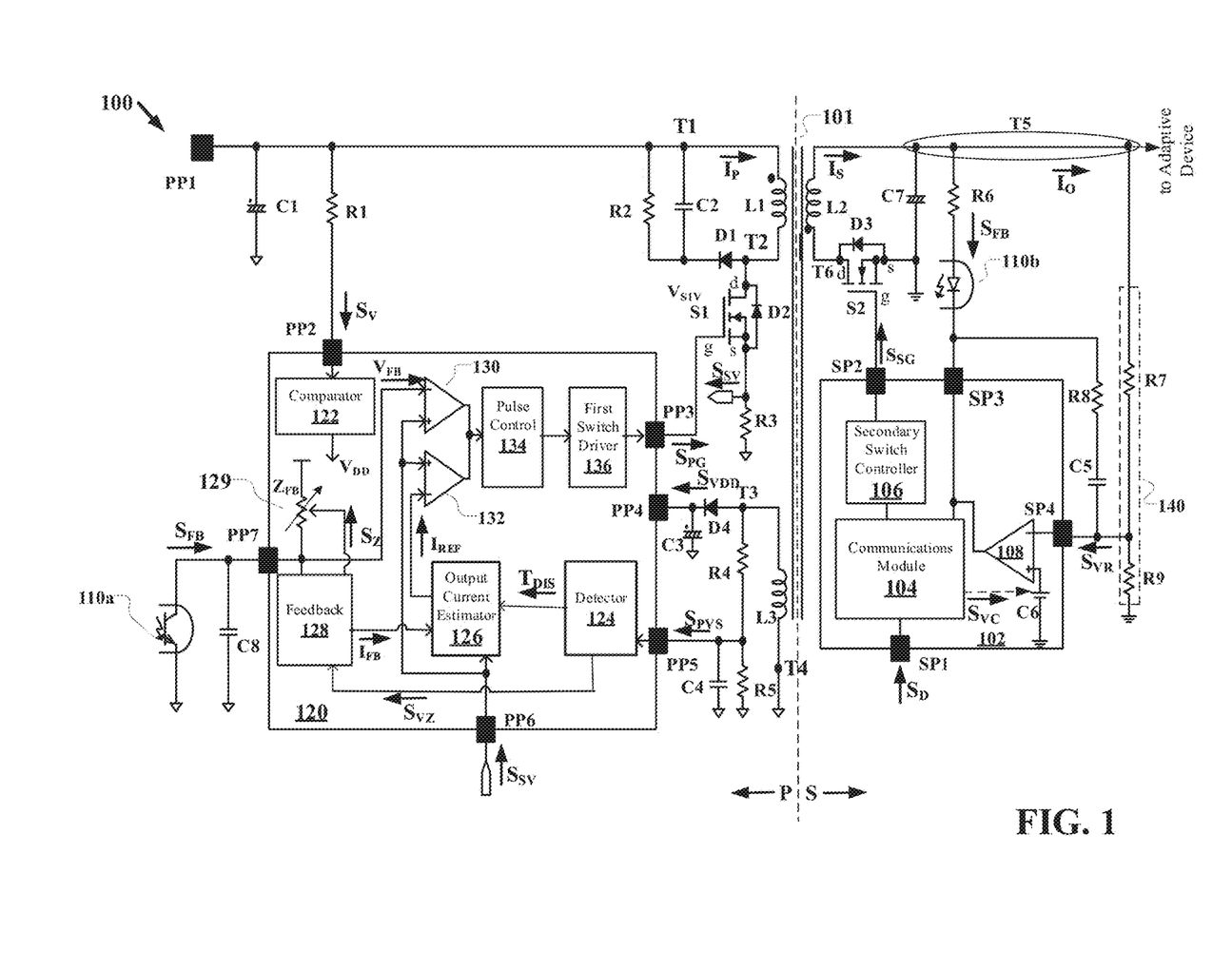
FIG. 1 is schematic representation of an electrical circuit for controlling the output currents and voltages provided by a power converter to an adaptive device in accordance with a first embodiment of the present disclosure.

As shown in FIG. 1 and for at least one embodiment of the present disclosure, a power converter 100 having a primary side P and a secondary side S is provided. The power converter 100 may be configured to include a transformer 101 having a first coil L1, a second coil L2 and a third coil L3. The first coil L1 and third coil L3 being located on a primary side P of the power converter 100 and the second coil L2 being located on a secondary side S of the power converter 100.

Primary Side of Power Converter

First Coil:

The first coil L1 includes a first terminal T1 suitably connected to a first primary port PP1 which, in at least one embodiment, functions as a primary input power port configured to receive input voltages and currents from a power source (not shown). The power source may be an alternating current (AC) source whose input signal is suitably rectified into a direct current (DC) source, a DC power source, or otherwise. Input power signal conditioning may be provided using capacitor C1. Power converter 100 may include diode D1, capacitor C2 and resistor R2. Diode D1 is connected in series with C2 and R2 and to the second terminal T2. C2 and R2 are connected in parallel to the first coil L1 at terminal T1. D1, C2 and R2 prevent higher voltage stress on the first switch S1. Resistor R1 may also be provided and is connected to the first terminal T1 to provide a primary controller 120, via a second primary port PP2, with a primary input voltage signal $S_V$ which is a representation of the input voltages provided by the power source to the first coil L1. The components, connectivity and signals used by the primary controller 120 are discussed in greater detail below.

First Switch:

A first switch S1 is connected to the second terminal T2 of the first coil L1 and is used to control the operating status ("ON" or "OFF") of the first coil L1. In at least one embodiment, the first switch S1 is a MOSFET with the drain being connected to the second terminal T2. It is to be appreciated that in other embodiments, other configurations and or arrangements of switching components, including MOSFETS or otherwise, may be utilized as desired for any implementation. A diode D2 may be connected to the second terminal T2, in parallel with the first switch S1, and across the drain and source of the first switch S1.

The gate of the first switch S1 is connected to a third primary port PP3 of the primary controller 120. The primary controller 120 is configured to generate and communicate to the first switch S1, via the third primary port PP3, the primary gate control signal $S_{PG}$, which controls the duration (pulse width) and frequency during which the first switch S1 (and in turn the first coil L1) are "ON" and "off." It is commonly appreciated that the period between successive "ON" and "OFF" cycles of the first coil L1 of the transformer 101 is a "switching cycle". As shown in FIG. 3C, a primary current $I_P$ is generated through the first coil L1 during each switching cycle. For any given switching cycle, a duty cycle exists, which is defined by the equation: DC=(on time)/(switching period) which has a number between 0 and 1. FIG. 3B illustrates three switching cycles (collectively, the "switching cycles") used herein to describe the operations of the power converter, as expressed herein for purposes of description in terms of the primary gate control signal $S_{PG}$, specifically:

1) tss-t0: a "$1^{st}$ steady-state cycle" during which the first switch S1 proceeds through one or more switching cycles where the S1 duty cycle, for each switching cycle, is controlled in accordance with known methods;
2) t0-t6: a "$2^{nd}$ or request cycle" during which operation of the first switch S1 is suspended during the switching cycle for an extended "off time" (for example, the extended "OFF" time arising between t4 and $t_6$) to process a load request received by the power converter 100 in a device signal $S_D$ sent by an adaptive device; and
3) after t6: the "$3^{rd}$ steady-state cycles" during which the power converter and operation of the first switch S1 resume normal steady-state cycling operations; it is to be appreciated that the $3^{rd}$ to $n^{th}$ steady-state cycle continues until a new load request is received and processed, or operation of the power converter ceases.

As shown in FIG. 1, the source of the first switch S1 is connected to a resistor R3 which is also connected to ground. When the first switch S1 is "ON", the sensed voltage signal $S_{SV}$ is generated and represents the current across the drain and source of the first switch S1. More specifically, the sensed voltage signal $S_{SV}$ is a scaled representation of the primary current $I_P$ as mathematically expressed by: $S_{SV}=I_P*R3$. When the first switch is "on," electrical currents flow from the power source and through the first coil L1, the first switch S1 and resistor R3 to ground. FIG. 3F illustrates a first switch voltage $V_{S1V}$ that arises across the drain and source of the first switch S1 during each of the switching cycles. The sensed voltage signal $S_{SV}$ is provided to the primary controller 120 via a sixth primary port PP6.

Third Coil:

The power converter 100 and transformer 101 also includes a third coil L3. The third coil L3 includes a third terminal T3 and a fourth terminal T4 which is grounded. The third terminal T3 is connected to the primary controller 120 via diode D4 and the fourth primary port PP4. The third terminal T3 is also connected to the primary controller 120 via a first voltage divider circuit 138 formed by resistors R4 and R5 and the fifth primary port PP5. During each switching cycle, the third coil L3 provides to the primary controller 120 two signals representative of the voltages and currents transferred by the first coil L1 to the second coil L2. First, the third coil L3 generates and provides power, which is referred to herein as an applied voltage signal $S_{VDD}$. $S_{VDD}$ is provided to the primary controller 120 via the fourth primary port PP4. $S_{VDD}$ is not shown in FIG. 3. Second, the third coil L3 generates and provides, via the fifth primary port PP5, the primary controller 120 with a scaled primary voltage signal $S_{PVS}$. $S_{PVS}$ is a scaled representation of the first switch voltage $V_{S1V}$ (as shown in FIG. 3F). $S_{PVS}$ for each of the three above identified switching cycles is shown in FIG. 3G. Diode D4 and capacitors C3 and C4 provide conditioning for the $S_{VDD}$ and $S_{PVS}$ signals.

Opto-Coupler:

The power converter 100 also includes an opto-coupler 110a-b which includes a receive element 110a on the primary side P and a send element 110b on the secondary side S. The opto-coupler 110a-b is configured to generate a feedback signal $S_{FB}$, which may include a communication request (as described below), and is communicated to the primary controller via a seventh primary port PP7. Capacitor C8 provides conditioning for the $S_{FB}$ signal. FIG. 3H illustrates the feedback signal $S_{FB}$ received by the power controller 100 and as generated by the secondary side S of the power converter 100 over each of the above described switching cycles. As discussed below, the feedback signal $S_{FB}$ represents both the voltages provided by the power converter during the steady-state cycles and the desired output voltage and current information needed to process a new load request received from an adaptive device during the request cycle. Each requested voltage and/or current information communicated in the feedback signal $S_{FB}$ are defined herein as being a "communication request."

As shown in FIG. 3F and from t4 to t5, the feedback signal $S_{FB}$ may represent, the load request, as received from the device, converted by the communications module 104 and sent to the primary controller as a communication request, as a series of digital pulses during an extended "OFF" time for the first switch S1 and the second switch S2. Any given series of pulses may represent a request by the adaptive device of a then desired output voltage and current. It is to be appreciated that other signal representations, in the analog and/or digital domains, may be used to represent and communicate a communication request from the secondary controller 102 to the primary controller 120 via a single opto-coupler 110a-b. In accordance with at least one embodiment, a communication request arises during a single request cycle. In accordance with another embodiment, a communication request may arise during two or more successive request cycles. Per at least one embodiment, the voltage and current thresholds presented in a communication request remains in effect until a new communication request is communicated by an adaptive device. Per at least one embodiment, a communication request remains in effect for a specified period. It is to be appreciated that the amount of time needed to communicate a communication request may vary based on the length of the request and the duration of any request cycle. That is, the duration of the extended "OFF" time is not fixed. Accordingly, the various embodiments of the present disclosure are not limited to any specific number of request cycles or lengths thereof. But, as discussed above, may be configured to communicate a communication request during as few as one request cycle. In at least one embodiment, a request cycle lasts less than a few micro-seconds.

Figure 3A:
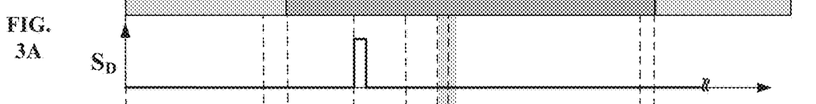
FIG. 3A is a timing diagram illustrating the device signal $S_D$ in accordance with certain principles of operation of the first embodiment of the present disclosure.
Figure 3B:
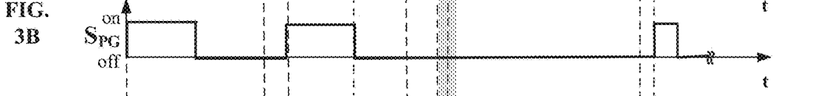
FIG. 3B is a timing diagram illustrating a primary gate control signal $S_{PG}$ in accordance with certain principles of operation of the first embodiment of the present disclosure.
Figure 3C:
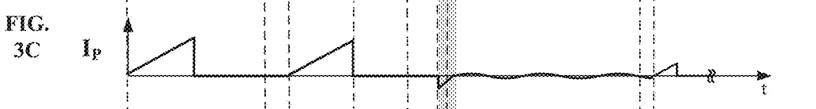
FIG. 3C is a timing diagram illustrating a primary current $I_P$ in accordance with certain principles of operation of the first embodiment of the present disclosure.
Figure 3D:
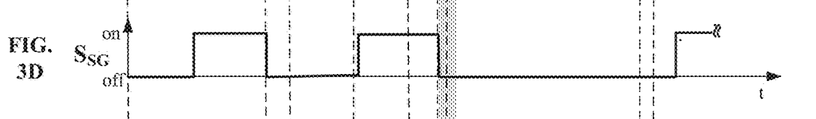
FIG. 3D is a timing diagram illustrating a secondary gate control signal $S_{SG}$ in accordance with certain principles of operation of the first embodiment of the present disclosure.

FIG. 3A illustrates the initiation of a load request communication with the receipt by the power converter 100 of a device signal $S_D$ sent by an adaptive device in accordance with at least one embodiment. As shown in FIG. 3A, device signal $S_D$ may be a short duration pulse, sent at t1, and initiates the beginning of a request cycle. As shown in FIG. 1, the device signal $S_D$ is communicated to a secondary controller 102 via first secondary port SP1. In other embodiments, device signal $S_D$ may last for a desired period, such as the duration of time necessary to communicate a communication request over two or more request cycles.

Primary Controller:

The primary controller 120 includes various components configured to control the output current of the power converter 100 based on communications received from an adaptive device. The components of and operations performed by primary controller 120 may be provided in one or more integrated circuit assemblies and may include the use of commonly known circuit elements including, but not limited to, logical, discrete elements, active and passive elements. In accordance with at least one embodiment, the primary controller 120 includes an input/output comparator circuit 122, a detector circuit 124, an output current (IO) estimator circuit 126, a feedback circuit 128, a variable resistor 129, a first comparator 130, a second comparator 132, a pulse controller 134, and a first switch driver 136 (each of these components are further described below).

Input/Output Comparator 122:

As shown in FIG. 1, the primary controller 120 may include a start up an input/output comparator circuit 122 which includes one or more components by which input voltages and/or currents provided by the power source to the primary controller 120, via the first primary port PP1, resistor R1 and the second primary port PP2 are converted into currents used to power the primary controller 120 during start-up of the power converter 100. For at least one embodiment, the input/output comparator circuit 122 is configured to provide an applied voltage signal $V_{DD}$ to the primary controller 120 during start-up. As discussed above, after the start-up phase, the primary controller 120 is powered by the applied voltage signal $S_{VDD}$ during each switching cycle.

Figure 3E:
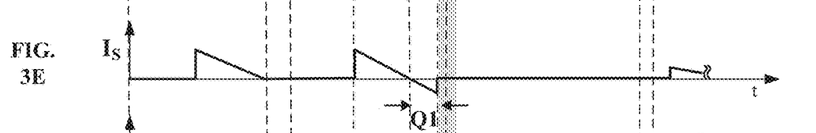
FIG. 3E is a timing diagram illustrating a secondary current $I_S$ in accordance with certain principles of operation of the first embodiment of the present disclosure.
Figure 3F:
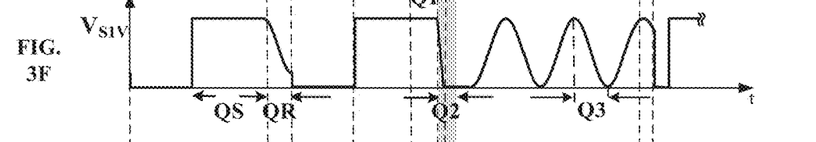
FIG. 3F is a timing diagram illustrating a first switch voltage $V_{S1V}$ in accordance with certain principles of operation of the first embodiment of the present disclosure.
Figures 3G, 3H:
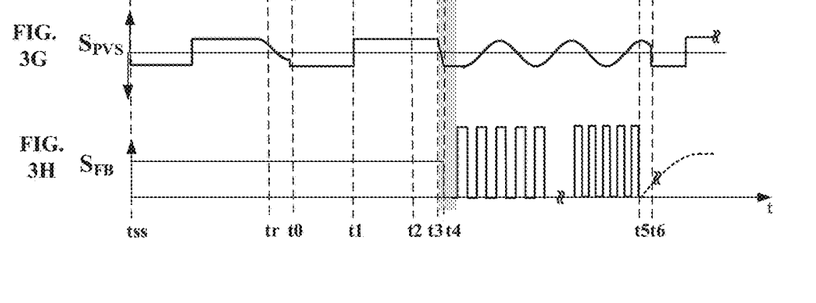
FIG. 3G is a timing diagram illustrating a scaled primary voltage signal $S_{PVS}$ in accordance with certain principles of operation of the first embodiment of the present disclosure.
FIG. 3H is a timing diagram illustrating a feedback signal $S_{FB}$ in accordance with certain principles of operation of the first embodiment of the present disclosure.

Detector Circuit 124:

The primary controller 120 may also include the detector circuit 124 which is configured to receive, via the fifth primary port PP5, the scaled primary voltage signal $S_{PVS}$. The detector circuit 124 analyzes the received signal and determines when the slope thereof changes. As shown respectively in FIG. 3F and in FIG. 3G by period QR, during the first steady-state cycle (and, while not shown, but, for each of the successive $3^{rd}$ steady-state cycles) the slopes of each of the first switch voltage signal $V_{S1V}$ and the scaled primary voltage signals $S_{PVS}$ have a first slope. When the secondary controller 102 receives $S_D$ from the device, as shown arising at time t1 in FIG. 3A, the request cycle begins. In response to receiving $S_D$, the secondary controller 102 extends the turn-on time for the second switch S2, as shown in FIG. 3E by the period Q1. Due to the second switch S2 being on longer, the slope of the drain voltage of the primary side changes during period t3-t4, as shown by the shaded portion in FIGS. 3F and 3G. The detector circuit 124 detects this change in slope in the $S_{PVS}$ signal and generates and sends a variation signal $S_{VZ}$ to the feedback circuit 128, thereby notifying the feedback circuit 128 when a communication request is forthcoming in the feedback signal $S_{FB}$.

The detector circuit 124 is also configured to determine, during steady-state cycles, when the secondary current $I_S$ reaches zero, as shown in FIG. 3E at time tr. The detector circuit 124 can determine when time tr occurs based on when the slope begins to change in the received scaled primary voltage signal $S_{PVS}$, as shown in FIG. 3G. The detector circuit 124 outputs a time duration signal which represents the second switch conduction time $T_{DIS}$, to an output current estimator circuit 126 described further below.

Output Current Estimator Circuit 126:

The primary controller 120 may also include an output current estimator circuit 126 configured to receive the time duration signal for the second switch conduction time $T_{DIS}$ and, via the sixth primary port PP6, the sensed voltage signal $S_{SV}$. Using these signals and the operating frequency of the power converter 100, the output current estimator circuit 126 can estimate the output current $I_O$. It is to be appreciated, that the secondary current $I_S$ pulsates in a triangular form, as in FIG. 3E, while the output current $I_O$ is a DC current.

As shown in FIG. 3F during the 1st steady-state cycle, the first switch voltage signal $V_{S1V}$ generally has a consistent waveform (as is common for switch based power converters). This waveform commonly has a constant "ON" portion, during period QS, and a resonant portion, during period QR. It is to be appreciated that the duration of QS varies with the pulse width control of the first switch S1 over time. The resonant portion QR generally remains consistent based on inherent properties of the first switch S1, first coil L1 and the signal conditioning components used in conjunction therewith. The output current estimator 126 also receives from the feedback circuit 128, a feedback current signal $I_{FB}$. During steady-state cycles, the feedback current signal $I_{FB}$ informs the output current estimator circuit 126 of then arising output current $I_S$. During a request cycle, $I_{FB}$ informs the output current estimator circuit 126 of the output current requested by the adaptive device for the next steady-state cycle, as communicated to the power converter in the $S_D$ signal.

Based on the received $T_{DIS}$, $S_{SV}$ and $I_{FB}$ signals, the output current estimator circuit 126 may also be configured to generate and communicate to a second comparator 132 a reference voltage for output current signal $I_{REF}$. In accordance with known switch mode power converter operations, $I_{REF}$ may be used by the primary controller 120 to regulate the output current of the power converter 100 during steady-state cycles. During request cycles, the output current provided by the power converter vary, as shown for example in FIG. 3E.

Feedback Circuit 128:

The primary controller 120 may also include a feedback circuit 128 configured to receive the communication request communicated by the adaptive device as represented in the feedback signal $S_{FB}$ communicated from the communications block 104 of the secondary controller 102 and the send element of the opto-coupler 110b to the receive element of the opto-coupler 110a and the seventh primary port PP7 of the primary controller 120. A representation of the feedback signal $S_{FB}$ is shown in FIG. 3H.

The feedback circuit 128 is configured to receive the variation signal $S_{VZ}$. Upon receiving the variation signal $S_{VZ}$, the feedback circuit 128 outputs an impedance change signal $S_Z$ to a variable resistor 129. The impedance change signal $S_Z$ readies the primary controller 120 for receipt of the communication request sent via the opto-coupler 110a-b in the feedback signal $S_{FB}$ by configuring the first switch S1 to remain in an open circuit (an "OFF" state) configuration. It is to be appreciated that the impedance of the variable resistor 129 is used to provide a reference voltage signal $V_{FB}$ to a first comparator 130. Based on a comparison of $V_{FB}$ with $S_{SV}$ by the first comparator 130, the primary controller 120 adjusts the duty cycle of the first switch S1. Accordingly, by instructing the variable resistor 129 to change the value of $V_{FB}$ at time t4 (see e.g., FIG. 3H) to a null level, such as zero volts in at least one embodiment, the impedance change signal $S_Z$ effectively instructs the pulse controller 134 to not generate pulses for the next switching cycle. By not generating switching cycles, the first switch S1 remains open and the duration of the "OFF" portion of the then arising switching cycle is extended, as represented by the above described request cycle between t4 to t6.

As discussed above, the feedback circuit 128 also receives and decodes the feedback signal $S_{FB}$. The feedback signal $S_{FB}$ includes a pulse encoded digital signal representative of the output voltage and current requested at that time by the adaptive device. As discussed above, the feedback circuit 128 communicates the requested output current in the feedback current signal $I_{FB}$ to the output current estimator circuit 126.

In an embodiment where PSR is used for output voltage regulation and SSR is used for output current regulation, the feedback signal $S_{FB}$ may be utilized to communicate the requested output voltage to the primary controller 120. In an embodiment where SSR is used for output voltage regulation and PSR is used for output current regulation, the feedback signal $S_{FB}$ may be utilized to communicate the requested output current to the primary controller 120. In an embodiment where SSR is used for both output voltage and output current regulation, the feedback signal $S_{FB}$ may be utilized to communicate the requested output voltage and current to the primary controller 120. It is to be appreciated, however, that for this SSR only embodiment, a second opto-coupler is commonly utilized.

The feedback circuit 128 may also be configured to send a second impedance change signal $S_{2Z}$ (not shown) to the variable resistor 129 upon the conclusion of a request cycle. The second impedance change signal $S_{2Z}$ changes the resistance provided by the variable resistor 129 from request cycle (null) levels to a desired steady-state operating level (such as a default level) and, thereby adjusts the reference voltage signal $V_{FB}$ provided to the first comparator 130 such that switching operations may resume for the first switch S1 and the $3^{rd}$ (steady-state) switching cycles may occur.

It is to be appreciated for the combined regulation, CR, implementation that by having the feedback circuit 128 indirectly change the reference voltage signal $V_{FB}$ provided to the first comparator 130 and the reference voltage for output current signal $I_{REF}$ provided to the second comparator 132, the primary controller 120 can be utilized to control either the output voltage or the output current of the power converter 100 based upon signals communicated from the secondary side S of the power converter 100 using a single opto-coupler.

First Comparator 130, Second Comparator 132, Pulse Controller 134, and First Switch Driver 136:

The primary controller 120 also may be configured to include a first comparator 130, a second comparator 132, a pulse controller 132 configured to control the duty cycle, and a first switch driver 136 configured to control the opening and closing of the first switch S1. These components are common to switch mode power supplies and are not described further herein.

Secondary Side of Power Converter

Second Coil, L2:

The secondary side S of the power converter 100 includes the before mentioned second coil L2 which has fifth terminal T5 and sixth terminal T6. Fifth terminal T5 is suitably connected in parallel to the adaptive device (not shown), output capacitor C7, bias resistor R6, and to a second voltage divider circuit 140 formed by resistors R7 and R9. As shown in FIG. 3E, the second coil L2 generates an output/secondary current $I_S$ during each switching cycle. The second coil L2 also outputs an output voltage $V_O$ (not shown) during each switching cycle. The output voltage $V_O$ on the output capacitor C7 is sensed by the second voltage divider circuit 140 and communicated in a reference voltage signal $S_{VR}$ to a secondary controller 102 via fourth secondary port SP4.

The bias resistor R6 is connected in series to the fifth terminal T5 and the send element 110b of the opto-coupler 110a-b. The feedback signal $S_{FB}$ is also communicated to the secondary controller 102 via a third secondary port SP3. As discussed in greater detail below, while a load request is being received and processed by the secondary controller 102, the secondary controller 102 generates the feedback signal $S_{FB}$. The feedback signal $S_{FB}$ is communicated from the secondary controller 102, via the third secondary port SP3 and the opto-coupler 110a-b, to the primary controller 120.

Secondary Switch:

The second coil L2 is also connected via sixth terminal T6 to a secondary switch S2 used to control the operating status ("ON" or "OFF") of the second coil L2. In at least one embodiment, the secondary switch S2 is a MOSFET with the drain being connected to the sixth terminal T6. It is to be appreciated that in other embodiments, other configurations and or arrangements of switching components, including MOSFETS or otherwise, may be utilized as desired for any implementation. A diode D3 may be connected to the sixth terminal T6, in parallel with the secondary switch S2 and across the drain and source of the secondary switch S2. The drain of the secondary switch S2 is connected to sixth terminal T6, the source is connected to ground, and the gate is connected to a secondary controller 102 via a second secondary port SP2.

In accordance with at least one embodiment where PSR is utilized for current regulation and SSR is utilized for voltage regulation, the secondary switch S2 can be used to lower conduction losses and realize higher system efficiencies than are possible using a Schottky diode or other approach. FIG. 3D illustrates the providing of the secondary gate signal $S_{SG}$ over multiple switching cycles for the secondary switch S2.

Secondary Controller:

The secondary controller 102 includes a communication block 104, a secondary switch controller 106, a third comparator 108, and a capacitor C6. For at least one embodiments, these components are coupled to each other as shown in FIG. 1. The components of and operations performed by secondary controller 102 may be provided in one or more integrated circuit assemblies and may include the use of commonly known circuit elements including, but not limited to, logical, discrete elements, active and passive elements.

Communications Block:

The communications block 104 is configured to receive, via a first secondary port SP1, and process the device signal $S_D$ communicated by an adaptive device. $S_D$ may be received in any desired format and, when present, is converted by the communication block 104, as necessary, into the feedback signal $S_{FB}$— which is provided to the primary controller 120, in a communication request, as a voltage representation of a digitally coded signal specifying the output voltages and currents requested in a load request. During a request cycle, the communications module 104 controls the third secondary port SP3 (e.g., by pulling-down and releasing the pin associated therewith) such that the feedback signal $S_{FB}$ provided to the opto-coupler is pulsed "ON" and "OFF" and thereby generates the sequence of pulses communicated by the opto-coupler 110a-b to the primary controller in the feedback signal $S_{FB}$, as shown in FIG. 3H between t4 and t5.

In at least one embodiment, such desired voltage and current approximates an "OFF" state where no voltage or current is provided to the adaptive device. In another embodiment, the load request requests a combination of voltages and currents ranging from 3 volts to 20 volts and lamp to 5 amps. It is to be appreciated, however, that the output voltages and currents, and ranges thereof are not limited to any specific implementations and may vary over any desired voltages, currents, combinations thereof and ranges thereof as desired for any given implementation of an embodiment of the present disclosure.

In accordance with at least one embodiment, the communications block 104 controls the on/off state of the opto-coupler 110b according to the digitally coded signal specifying the output voltages and currents requested in a load request. Since the impedance $Z_{FB}$ of the variable resistor 129 becomes smaller during a request cycle, for at least one embodiment, the coded signal can be transferred to the primary side via opto-coupler within several nanoseconds to several hundred nanoseconds. It is to be appreciated, that other ranges may be utilized in conjunction with other embodiments, as desired for any given implementation of an embodiment of the present disclosure. During a request cycle, $V_{FB}$ will commonly be low when opto-coupler 110b turns "ON" and $V_{FB}$ will commonly be high when the opto-coupler 110b turns "OFF". As discussed above, the feedback circuit 128 decodes this digitally coded signal and extract the information of voltages and currents requested by the device. In a CR embodiment, where SSR is use for voltage regulation and PSR is used for current regulation, the feedback circuit 128 generates the feedback current signal $I_{FB}$, which as discussed above is delivered to the output current estimator 126. The communications block may regulate the output voltage by adjusting the capacitance of capacitor C6, as discussed further below.

In an embodiment, where SSR is used for both current and voltage regulation, the feedback circuit 128 generates the feedback current signal $I_{FB}$ and a second impedance change signal $S_Z$ can be communicated using a second opto-coupler (not shown).

Secondary Switch Controller:

The secondary switch controller 106 is communicatively coupled, via the second secondary port SP2 to the gate of the second switch S2. The secondary switch controller 106 generates the secondary gate signal $S_{SG}$, which is used to control the secondary switch S2. FIG. 3D illustrates one embodiment of a secondary gate signal $S_{SG}$.

Third Comparator:

Third comparator 108 is suitably connected to the fourth secondary port SP4, the communications block 104, capacitor C6, and, via the third secondary port SP3, to the send element of the opto-coupler 110b. Per at least one embodiment, capacitor C6 is set at a threshold value representing the output voltage. In accordance with at least one embodiment, such as when CR or SSR is utilized, capacitor C6 may be adjustable and provide a variable reference that is adjusted by the communications module 104 based upon the output voltage requested by the device in the device signal $S_D$. When so configured to provide adjustable reference and when an output voltage change is requested by a device, communications module 104 communicates a reference change signal $S_{VC}$ to capacitor C6. Third comparator 108 provides signals representative of the then present output voltage of the second coil L2 to the communications block 104 and to the send element of the opto-coupler 110b. During steady-state cycles, such signal represents a substantially constant output voltage, where a substantially constant output voltage is one where minor permutations due to device and/or operating characteristics are within commonly acceptable ranges.

Figure 2:
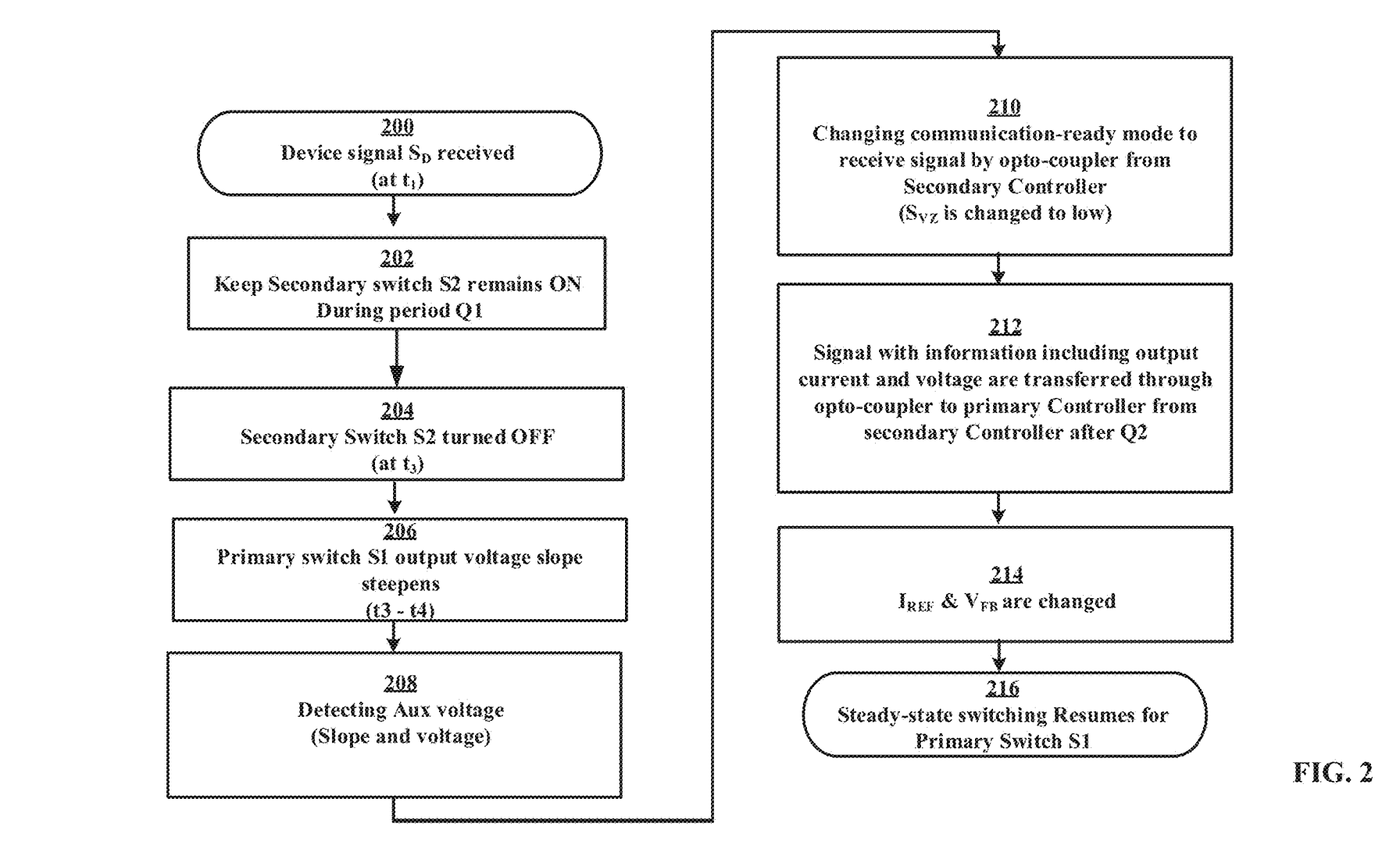
FIG. 2 is a flow chart representation of a method for controlling the output currents and voltages provided by a power converter to an adaptive device in accordance with the first embodiment of the present disclosure.

In FIG. 2, an embodiment is shown of a process by which the power converter 100 of the first embodiment can determine the output voltages and currents requested by an adaptive device and communicate and implement such changes using the single opto-coupler configuration of the present disclosure. The process begins with the receipt of the device signal $S_D$ by the communications module 104 of the secondary controller 102 and via the first secondary port SP1. As shown in FIG. 3A, this signal is represented by the pulse occurring at time t0. As discussed above, prior to time t0, FIG. 3 depicts the $1^{st}$ steady-state cycle operations.

In operation 202, the communications module 104 instructs the secondary switch controller 106 to extend the pulse width of the "ON" portion of the secondary switch S2 to include the additional "ON" period Q1. As shown in FIG. 3E, during steady-state cycle operations, such as at time tr, the secondary switch S2 turns "OFF" when, or slightly before, the secondary current $I_S$ reaches a null threshold, such as a zero threshold. In contrast, during a request cycle the "ON" period is initially extended, as per operation 202, and the polarity of the secondary current $I_S$ reverses, as occurs during Q1.

In operation 204 and at time t3, the communications module 104 instructs the secondary switch controller 106 to turn the secondary switch S2 "OFF". The "ON" and "OFF" states of the secondary switch are shown in FIG. 3D. As shown, the secondary switch S2 remains in an "OFF" state during the request cycle and while the load request, as communicated in the device signal $S_D$, is processed by the power converter. Time t6 represents the resumption of steady-state operations, at the new requested output voltage and current. As shown, for example, in FIGS. 3C and 3E after time t6, each of the primary current $I_P$ and the secondary current $I_S$ being illustrated as being smaller than they respectively were at time tss. These changes illustrate the processing of a load request from a device to reduce the output current.

It is to be appreciated that the extension of the "ON" time of the secondary switch S2 interrupts the resonance characteristics of the primary voltage signal $S_{PV}$, as represented for steady-state operations during period QR in FIG. 3F. As further shown in FIG. 3F, by the straight line portion of the $S_{PV}$ signal shown between times t3 and t4, immediately following the Q1 period (when the "ON" time of the second switch S2 is extended), the resonance characteristics of the primary voltage signal $S_{PV}$ during the $1^{st}$ steady-state cycle are no longer manifested in such signal during the request cycle.

Per Operation 206, the detector circuit 124 is configured to receive and detect in the scaled primary voltage signal $S_{PVS}$ the corresponding representation of this change in slope in the voltage signal $S_{S1V}$. As shown in FIG. 3F, after time t3 (at the end of period Q1) the output voltage characteristics of the voltage signal $S_{S1V}$ steeply fall and the resulting primary current IP reverses its polarity. The detector circuit 124 can be configured to compare the slope of the scaled primary voltage signal $S_{PVS}$ over period QR to the slope over period Q2 to be ready to receive a new load request received from the adaptive device. That is, in accordance with at least one embodiment, the secondary controller 102 can be configured to inform the primary controller 120 that a load request has been received by comparing the slope of the resonant period QR in the first switch voltage $V_{S1V}$ as detected during the previous $1^{st}$ steady-state cycle and as communicated to the detector circuit in the scaled primary voltage signal $S_{PVS}$, with the slope of the resonant period arising during period Q2.

Per Operation 208, the change of the slope of the scaled primary voltage signal $S_{PVS}$ occurs between times t3 and t4.

Per Operation 210, the communications module 104 of the secondary controller 102 changes the communications mode of the send element of the opto-coupler 110b to be ready to communicate the pulse encoded digital signal representative of the output voltage and current requested at that time by the adaptive device, as provided in the device signal $S_D$. In accordance with at least one embodiment, the detector circuit 124 may be configured to detect the change in the slope before generating the variation signal $S_{VZ}$. In other embodiments, the detector circuit 124 may be configured to generate the variation signal $S_{VZ}$ upon the detection of a change in slope. In one embodiment, the detector circuit 124 outputs a variation signal $S_{VZ}$ with a low value, but, other signal values may be used and as desired for any given implementation.

Per Operation 212, the feedback signal $S_{FB}$ containing the pulse encoded digital signal representative of the output voltage and current requested at that time by the adaptive device is communicated via the opto-coupler 110a-b to the primary controller 120. As shown in FIG. 3H, such communication occurs between times t4 and t5. This resonance has a slope and can be sampled over a given period, as represented by period Q3. As shown in FIG. 3F between times t4 and t5, $V_{S1V}$ begins to resonate while the first switch S1 is "OFF." This resonance occurs due to the magnetizing inductance and parasitic capacitance of the circuits. Further, it is to be appreciated that instead of communicating a representation of the output voltage in the feedback signal $S_{FB}$, as occurs during steady-state cycling, the opto-coupler 110b is controlled by the communications module 104 to send a series of pulses represented of the load request. This control may arise by the communications module 104 controlling the status of the third secondary port SP3, such as in a pulled-down and released state.

It is to be appreciated that the communication of such communication request may or may not occur during the period normally required for one or more steady-state cycles. As shown in FIG. 3B, while the communication request is communicated to the primary controller, control of the primary and secondary switches is interrupted.

Per Operation 214, once the primary controller 120 receives and decodes the communication request, the reference current and/or reference voltage signals are adjusted accordingly. As discussed above, the various embodiments may be used with PSR, SSR or CR to adjust both the voltages and currents output by the power converter. For at least one embodiment, when the secondary side is used to control the output voltage, the secondary controller 102 may adjust the output voltage by changing the variable reference of C6.

Per Operation 216, at time t6 steady-state cycle operations resume with normal control of the output voltages being provided by the primary and secondary controllers, as depending on whether PSR, SSR or CR is used, and control of the output current being provided by the primary controller, when PSR or CR is used. Such control is provided in view of the previously processed load request. Such steady-state cycle operations continue until a new load request is received or the power converter is turned "off."

As discussed above and as shown in FIG. 3E, while the communication request is being processed by the primary controller 120, operation of the first switch S1 and the second switch S2 are interrupted. These interruptions may result in unpredictable and undesirable fluctuations in the output voltages and currents provided to the adaptive device.

Figure 4:
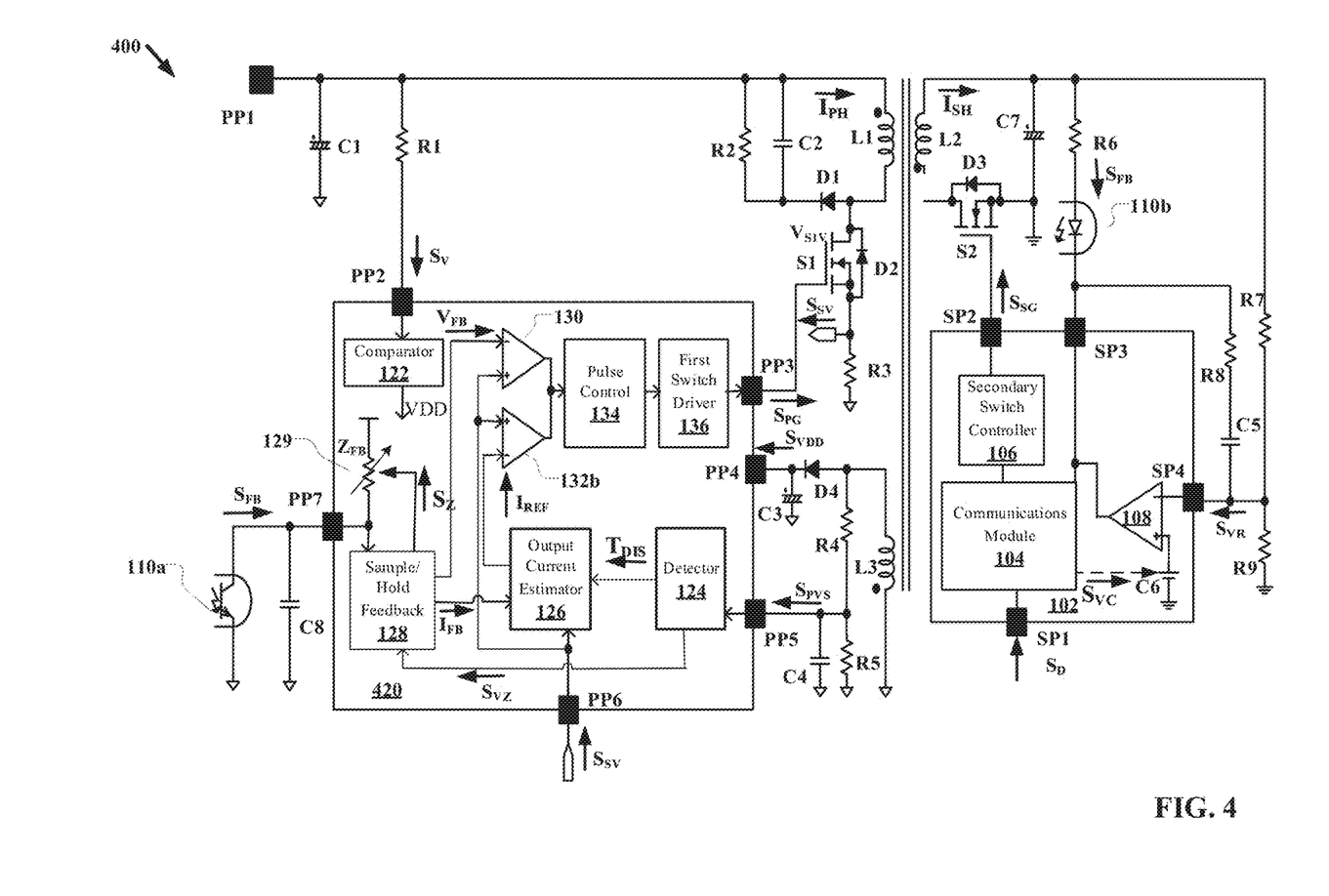
FIG. 4 is schematic representation of an electrical circuit for controlling the output currents and voltages provided by a power converter to an adaptive device in accordance with a second embodiment of the present disclosure.

In FIG. 4, one embodiment is shown for adjusting for such variations by maintaining operation of the power converter at the 1$^{st}$ steady-state cycle operating condition while the communication request is being processed during the 2$^{nd}$ request cycle. In FIG. 4, those components common with the prior embodiment are shown has containing the same part numbers and circuit elements. Such components are not further described herein. Per this second embodiment, a modified primary controller 420 includes a sample and hold feedback circuit 428. The sample and hold feedback circuit provides all the functions and components of the feedback circuit 128 of the first embodiment, but, also includes additional circuitry and connections as further described below.

More specifically, while both the feedback circuit 128 and sample and hold feedback circuit 428 receive, in the feedback signal $S_{FB}$, and forward as the $V_{FB}$ signal to the first comparator 130 during steady-state cycling operations, the sample and hold circuit 428 is further configured to hold, cycle-by-cycle, the immediately previously communicated $V_{FB}$ signal during the 1$^{st}$ steady-state cycle. Once a request cycle begins, the sample and hold feedback circuit 428 outputs the previously stored $V_{FB}$ to the first comparator 130 and thereby the primary controller 120 continues to resume switching cycles using the settings for the 1$^{st}$ steady-state cycle during the request cycle. The primary controller 120 thereby minimizes and/or avoids possible fluctuations arising in the output voltages and currents that may otherwise arise without the sample and hold feedback circuit 428.

Figure 5:
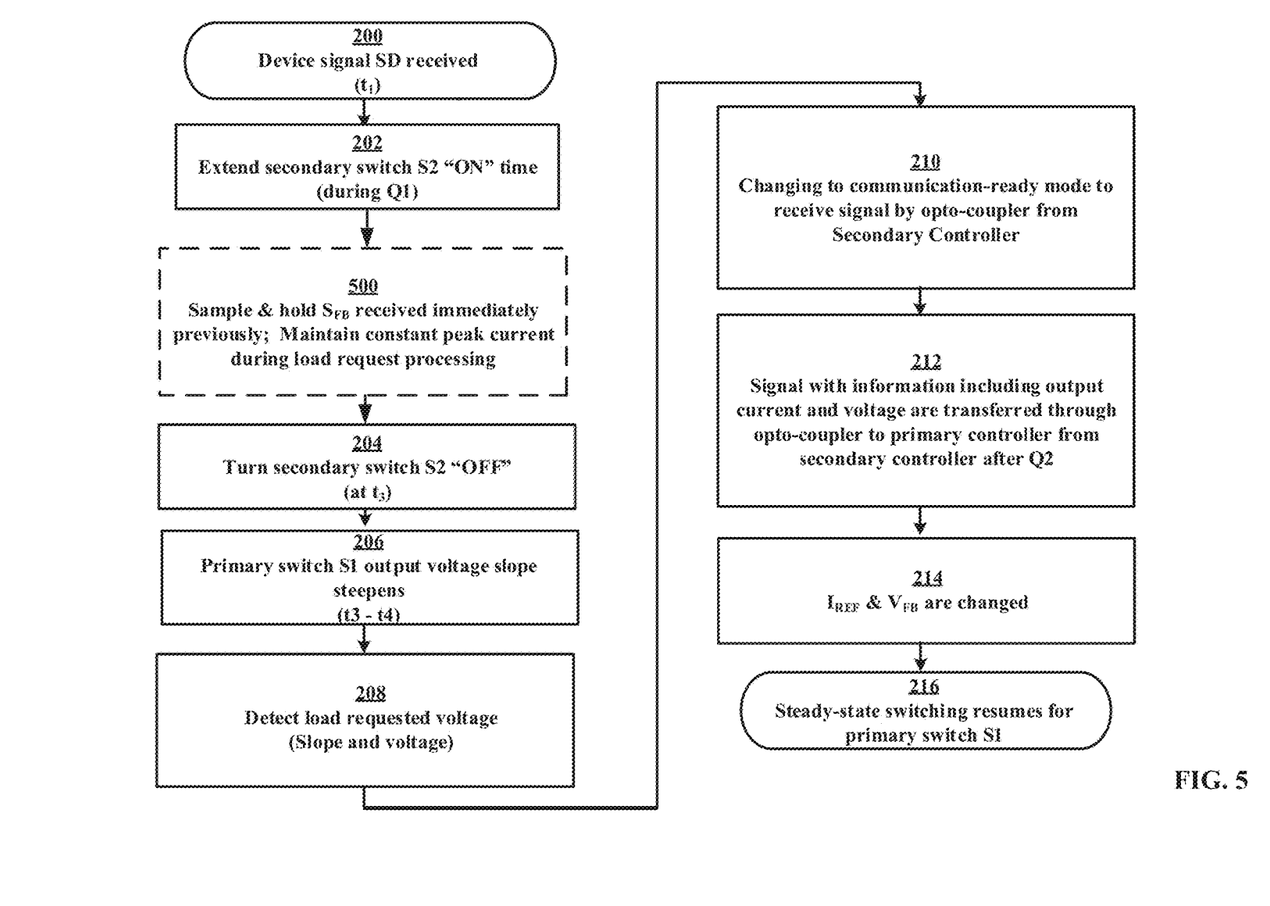
FIG. 5 is a flow chart representation of a method for controlling the output currents and voltages provided by a power converter to an adaptive device in accordance with the second embodiment of the present disclosure.
Figure 6A:
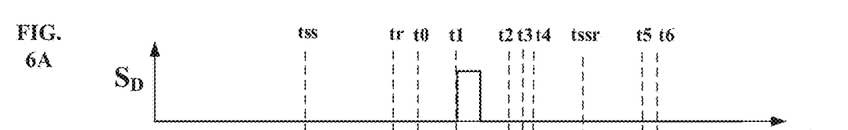
FIG. 6A is a timing diagram illustrating the device signal $S_D$ in accordance with certain principles of operation of the second embodiment of the present disclosure.
Figure 6B:
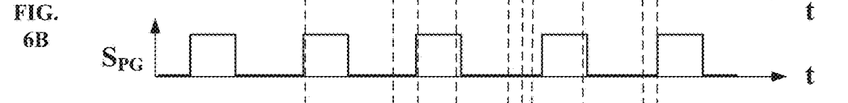
FIG. 6B is a timing diagram illustrating a primary gate control signal $S_{PG}$ in accordance with certain principles of operation of the second embodiment of the present disclosure.
Figure 6C:
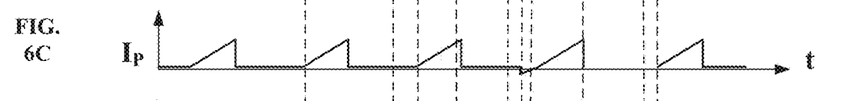
FIG. 6C is a timing diagram illustrating a primary current $I_P$ in accordance with certain principles of operation of the second embodiment of the present disclosure.
Figure 6D:
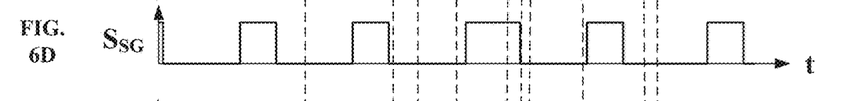
FIG. 6D is a timing diagram illustrating a secondary gate control signal $S_{SG}$ in accordance with certain principles of operation of the second embodiment of the present disclosure.
Figure 6E:
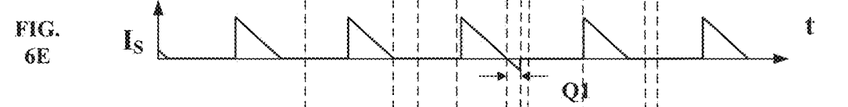
FIG. 6E is a timing diagram illustrating a secondary current $I_S$ in accordance with certain principles of operation of the second embodiment of the present disclosure.
Figure 6F:
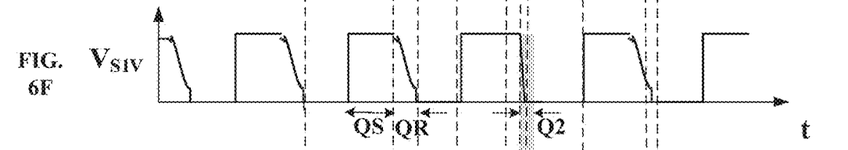
FIG. 6F is a timing diagram illustrating a first switch voltage $V_{S1V}$ in accordance with certain principles of operation of the second embodiment of the present disclosure.
Figure 6G:
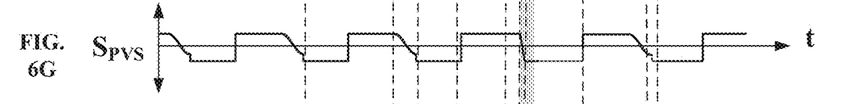
FIG. 6G is a timing diagram illustrating a scaled primary voltage signal $S_{PVS}$ in accordance with certain principles of operation of the second embodiment of the present disclosure.
Figure 6H:
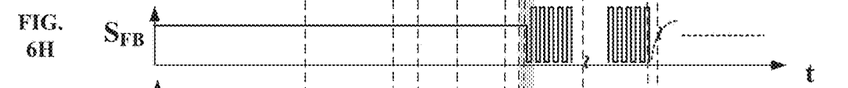
FIG. 6H is a timing diagram illustrating a feedback signal $S_{FB}$ in accordance with certain principles of operation of the second embodiment of the present disclosure.
Figure 6I:
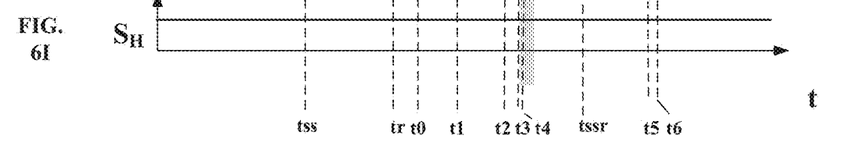
FIG. 6I is a timing diagram illustrating a sample and hold operating status $S_H$ in accordance with certain principles of operation of the second embodiment of the present disclosure.

This modification in the process flow for use of a sample and hold feedback circuit 428 is shown in FIG. 4 and in FIG. 5 by alternative operation 500. Also, as shown in FIG. 6, the use of the sample and hold feedback circuit 428 results in each of the primary and secondary switches, S1 and S2, continuing with steady-state cycling operations, as shown in FIGS. 6B and 6C for the primary switch and primary current $I_P$, and in FIGS. 6D and 6E for the secondary switch and secondary current $I_S$. Per at least one embodiment, upon receiving the device signal $S_D$ at t1, the extended off period of a request cycle, as shown arising from t3 to t6 for the first embodiment (see FIG. 3) is shortened and the 1$^{st}$ steady-state cycling operations resume at time tssr.

Given that the primary switch S1 and first coil L1 continue to cycle, the first switch voltage signal $V_{S1V}$ and the scaled primary voltage signal $S_{PVS}$, quickly resume steady-state cycling operations as shown in FIG. 6 as resuming at time tssr. However, unlike the first embodiment, a separate resonance period, such as the period Q3 shown in FIG. 3, does not arise. Accordingly, the detector circuit 124 is configured to detect the change in slope arising at period Q2 for one duty cycle and with respect to the slope previously sampled during the QR period.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of embodiments and as not limiting. References to first, second, etc. terminals, coils, components or otherwise are for purposes of explanation and clarity only and are not intended to be limiting. Changes in detail or structure may be made without departing from the basic elements of the invention as defined in the following claims.

What is claimed is:

1. A power converter, comprising:
   a transformer, comprising:
   a first coil located on a primary side of the transformer;
   a second coil located on a secondary side of the transformer; and
   wherein the first coil is electrically coupled to a power source;
   wherein the second coil is electrically coupled to and configured to provide an output current and an output voltage to an adaptive device;
   wherein the primary side is electrically isolated from the secondary side;

a primary controller, electrically coupled to the first coil, configured to control an operating status of the first coil;
a secondary controller, electrically coupled to the second coil; and
an opto-coupler comprising a send side electrically coupled to the secondary controller and a receive side electrically coupled to the primary controller;
  wherein the opto-coupler is configured to communicate, during a request cycle, a communication request in a feedback signal generated by the secondary controller;
wherein the communication request represents a load request received from the adaptive device; and
wherein, during the request cycle, the primary controller suspends steady-state operation of the first coil.

2. The power converter of claim 1,
wherein the opto-coupler is electrically coupled to the second coil and the feedback signal represents the output current and the output voltage provided to the adaptive device during a first steady-state cycle and the feedback signal includes only the communication request during a second request cycle; and
  wherein the second request cycle begins upon a detection by the primary controller of a change of slope in a first switch voltage signal.

3. The power converter of claim 2,
wherein the load request is received from the adaptive device by the secondary controller and the secondary controller comprising logical and discrete elements configured to:
  convert the load request into the communication request; and
  communicate the communication request, in the feedback signal, to the primary controller by controlling an operating state of the opto-coupler.

4. The power converter of claim 3,
wherein the communication request is a pulse coded representation of the load request, and the second controller encodes the pulse coded representation into the feedback signal by controlling the operating state of the opto-coupler.

5. The power converter of claim 3, further comprising:
a first switch, coupled to the first coil and the first controller;
a second switch, coupled to the second coil and the second controller;
  wherein the second controller is configured to control an operation status of the second coil by controlling an operating state of the second switch;
wherein upon receiving the load request, the second controller is configured to:
  extend a turn-on time of the second switch until polarity of the second switch reverses; and
  during a third steady-state cycle arising after the completion of the request cycle, control the operating state of the second switch such that the second coil provides at least one of the output current and output voltage requested in an immediately previously received load request.

6. The power converter of claim 5,
wherein the secondary controller is configured to adjust the output voltage of the power converter, in response to the load request, by adjusting a reference voltage utilized by the secondary controller.

7. A primary controller, for use in controlling operation of a power converter, wherein the power converter comprises a transformer having a first coil on a primary side and a second coil on a secondary side, the primary side being electrically isolated from the secondary side, wherein the primary side is connected to a power source and the secondary side is connected to an adaptive device, comprising:
  at least one logical and discrete element configured to control an operating status of the first coil and adjust an output current of the power converter based upon a communication request received in a feedback signal communicated by a secondary controller to the primary controller via an opto-coupler;
  wherein the secondary controller is located on the secondary side, is electrically connected to the second coil and the adaptive device, and comprises one or more logical and discrete elements configured to independently control an operating status of the second coil; and
  wherein the primary controller is configured to detect a change in an "on" duration for the second coil by monitoring at least one resonance characteristic of a scaled representation of voltage signal for the first coil and, upon so detecting, process the communication request received in the feedback signal.

8. The primary controller of claim 7, comprising:
a first comparator, configured to compare a reference voltage signal to a sensed voltage signal;
a second comparator, configured to compare a reference voltage for output current signal to the sensed voltage signal; wherein the sensed voltage signal is generated by the power converter during each switching cycle;
a pulse controller, electrically connected to the first comparator and the second comparator, configured to generate duty-cycle signals for each switching cycle; and
a switch driver, electrically connected to the pulse controller and a first switch;
  wherein the first switch is electrically connected to and controls the operating status of the first coil; and
  wherein the switch driver controls the operating status of the first switch and the first coil for each switching cycle based on duty-cycle signals received from the pulse controller.

9. The primary controller of claim 8, comprising:
a detector circuit, electrically connected to a third coil and comprising logical and discrete elements configured to:
  output a time duration signal which provides a representation of a second switch conduction time;
  detect a change in a slope arising in a resonant portion of drain voltages of the first switch during a first steady-state switching cycle; and
  upon detecting a change in the slope, output a variation signal;
    wherein the variation signal initiates a request switching cycle for the power converter.

10. The primary controller of claim 9, comprising:
an output current estimator circuit, electrically connected to the second comparator, the first switch, and the detector circuit, and comprising logical and discrete elements configured to:
  receive the sensed voltage signal;
  receive the time duration signal;
  receive a feedback current signal; and
  generate and output the reference voltage for output current signal;
  wherein during a request cycle, the output current estimator circuit adjusts the reference voltage for output current signal based upon a load request received from the adaptive device by the secondary controller.

11. The primary controller of claim 10, comprising:
a feedback circuit, electrically connected to the detector circuit, the output current estimator circuit, the first comparator, a variable resistor, and the opto-coupler, and comprising logical and discrete elements configured to:
output the reference voltage signal to the first comparator;
output an impedance change signal which adjusts an impedance of the variable resistor;
decode, from a communication request provided in the feedback signal sent by the secondary controller to the primary controller during a request cycle, a requested output current received from the adaptive device; and
output to the current estimator circuit a feedback current signal representative of the requested output current.

12. The primary controller of claim 11,
where upon receiving the variation signal, the feedback circuit reduces impedance of the variable resistor to a null value and until the communication request is received and decoded.

13. The primary controller of claim 11,
wherein the feedback circuit is configured to:
sample and hold the reference voltage signal communicated in the feedback signal for the first steady-state switching cycle;
upon receipt of the variation signal, continue to output the held reference voltage signal to the first comparator while the communication request is decoded;
upon decoding the communication request, adjust the impedance of the variable resistor; and
output a second reference voltage signal to the first comparator, wherein the second reference voltage signal reflects a requested output voltage received from the adaptive device.

14. A method for controlling output voltages and currents of a power converter as requested by an adaptive device, wherein the power converter comprises a transformer having a first coil, a second coil and a third coil, wherein the first coil is on a primary side of the transformer and is electrically connected to a power source, the second coil is on a secondary side of the transformer and is connected to and provides the output voltages and currents to an adaptive device, and the third coil is a tertiary winding on the primary side of the transformer, wherein a primary controller controls an operating state of a primary switch connected to the first coil and is electrically connected to both the first coil and the third coil, and wherein a secondary controller is electrically isolated from the primary controller and controls an operating state of a secondary switch connected to the second coil, the method comprising:
during a first steady-state cycle,
receiving, by the secondary controller, a load request in a device signal sent by the adaptive device; and
executing a request cycle, by:
extending, by the secondary controller, an "ON" state for the secondary switch;
detecting, by a primary controller, a change of slope in a scaled primary voltage signal generated by the third coil;
entering, by the primary controller, into a communication-ready mode;
converting, by the secondary controller, the load request into communication information;
communicating, by the secondary controller, the communication information in a feedback signal using an opto-coupler communicatively connecting the secondary controller with the primary controller;
decoding, by the primary controller, the communication information;
adjusting, by the primary controller, at least one of a reference voltage for output current and a reference voltage; and
resuming steady-state switching with at least one third, steady-state cycle.

15. The method of claim 14,
wherein the communication information is encoded by the secondary controller into the feedback signal by controlling an operating state of the opto-coupler.

16. The method of claim 15,
wherein the load request includes an output voltage change request to change the output voltage and the method comprises:
during the request cycle:
adjusting, by the secondary controller, a first reference value of a variable capacitor to respond to the output voltage change request;
comparing the first reference value to a reference voltage signal; and
based on the comparison, adjusting the feedback signal.

17. The method of claim 15,
wherein the load request requests a change in the output current and the output voltage, and wherein the output current is controlled by the primary controller and the output voltage is controlled by the secondary controller.

18. The method of claim 15,
wherein the load request requests a change in the output current and the output voltage, and
wherein the output current is controlled by the secondary controller and the output voltage is controlled by the primary controller.

19. The method of claim 14,
wherein the operation of entering the communication-ready mode comprises:
adjusting a reference voltage signal utilized by the primary controller to control an operating state of the primary switch,
wherein the adjustment to the reference voltage signal results in the primary switch remaining in an "OFF" state.

20. The method of claim 19, comprising:
during the first steady-state cycle:
sampling and holding an output voltage signal communicated in the feedback signal by the secondary controller to the primary controller using the opto-coupler;
during the request cycle and while continuing to decode the communication information received from the secondary controller,
resuming steady-state operation of the primary switch by adjusting the reference voltage signal back to the previously sampled and held output voltage signal; and
after decoding the communication information, adjusting the reference voltage signal to reflect the output voltage requested by the adaptive device in the load request.

* * * * *